Aug. 14, 1951 G. K. JENSEN 2,563,841

FREQUENCY DIVIDER

Filed Dec. 1, 1949 5 Sheets-Sheet 1

Inventor
GAROLD K. JENSEN

By N. J. Hossfeld

ATTORNEY

Inventor
GAROLD K. JENSEN

By N. J. Hornfeld [signature]

ATTORNEY

Aug. 14, 1951 G. K. JENSEN 2,563,841

FREQUENCY DIVIDER

Filed Dec. 1, 1949 5 Sheets-Sheet 3

Inventor
GAROLD K. JENSEN

By N. J. Hosford

ATTORNEY

Aug. 14, 1951 G. K. JENSEN 2,563,841

FREQUENCY DIVIDER

Filed Dec. 1, 1949 5 Sheets-Sheet 4

Inventor
GAROLD K. JENSEN

By W. J. Hossfeld

ATTORNEY

Inventor
GAROLD K. JENSEN

By N. J. Hornfeld

ATTORNEY

Patented Aug. 14, 1951 2,563,841

UNITED STATES PATENT OFFICE 2,563,841

FREQUENCY DIVIDER

Garold K. Jensen, Pinecrest, Va.

Application December 1, 1949, Serial No. 130,572

6 Claims. (Cl. 235—92)

(Granted under the act of March 3, 1883, as amended April 30, 1928; 370 O. G. 757)

This invention relates to electric frequency divider systems in general and in particular to a divider system capable of receiving a signal of a selected frequency to produce an output signal at a selectable sub-multiple of the input signal.

In numerous applications of electric equipment it is desirable to obtain frequency division so that an input signal at a frequency which may be either fixed or variable may provide an output signal at a selected sub-multiple thereof. To obtain operation of this nature at a constant, selected division ratio it is not a simple matter to employ resonant electric circuits. On the other hand where input signals may be rather high in frequency, typically one megacycle per second, resonant electric circuits are generally used. It is immediately apparent therefore that ordinary previously available combinations of circuits would not be suited to provide constant ratio frequency division over a wide range of input frequencies. For convenience of operation or selection of the frequency division ratio at which operation is to be maintained it has been advantageous to employ counter circuits operating in a decimal digit system controlled by decimal digit selectors, manually operated, one for each decimal digit of the division ratio. With such decimal digit selectors each digit of the division ratio may be independently and rapidly inserted. Such decimal digit selection is known to all familiar with electrical measurements because it is just this sort of operation that is employed with resistance decade boxes in electrical bridge measurements where the units, tens, hundreds, and so forth decimal digit values of resistance may be inserted separately as by a multiple position switch for each digit.

It is accordingly an object of the present invention to provide frequency division apparatus which will operate over a wide frequency range to provide output signals at a frequency lower than the input frequency.

Another object of the present invention is to provide frequency division apparatus which will deliver output signals of a frequency which is a selected sub-multiple of the frequency of input signals.

Other and further objects and features of the present invention will become apparent upon a careful consideration of the following detailed description when taken in conjunction with the accompanying drawings in which.

In accordance with the basic features of the present invention, frequency division by any selected whole number is obtained with a plurality of digit dividers, one for each decimal digit of the division ratio. As many digit dividers are ordinarily employed as the maximum number of digits desired in the division ratio, typically four where division ratios up to 9999 to 1 are desired. The digit dividers are connected for operation in sequence, that is, a first divider allotted typically to the units digit of the division ratio receives input signals and supplies output signals to the second divider (tens). In turn the tens divider supplies signals to the hundreds divider, the hundreds divider to the thousands divider and so on if more digits are employed. All dividers except the last initially count up to the value of the corresponding digit of the division ratio, then reset themselves to subsequently provide output signals to the succeeding divider for each succeeding tenth input signal to the particular divider. The last divider provides an output whenever the desired value of the last digit is reached, at which time it also provides a reset signal to return all of the dividers to a reference condition from which to repeat operation.

Figure 1:
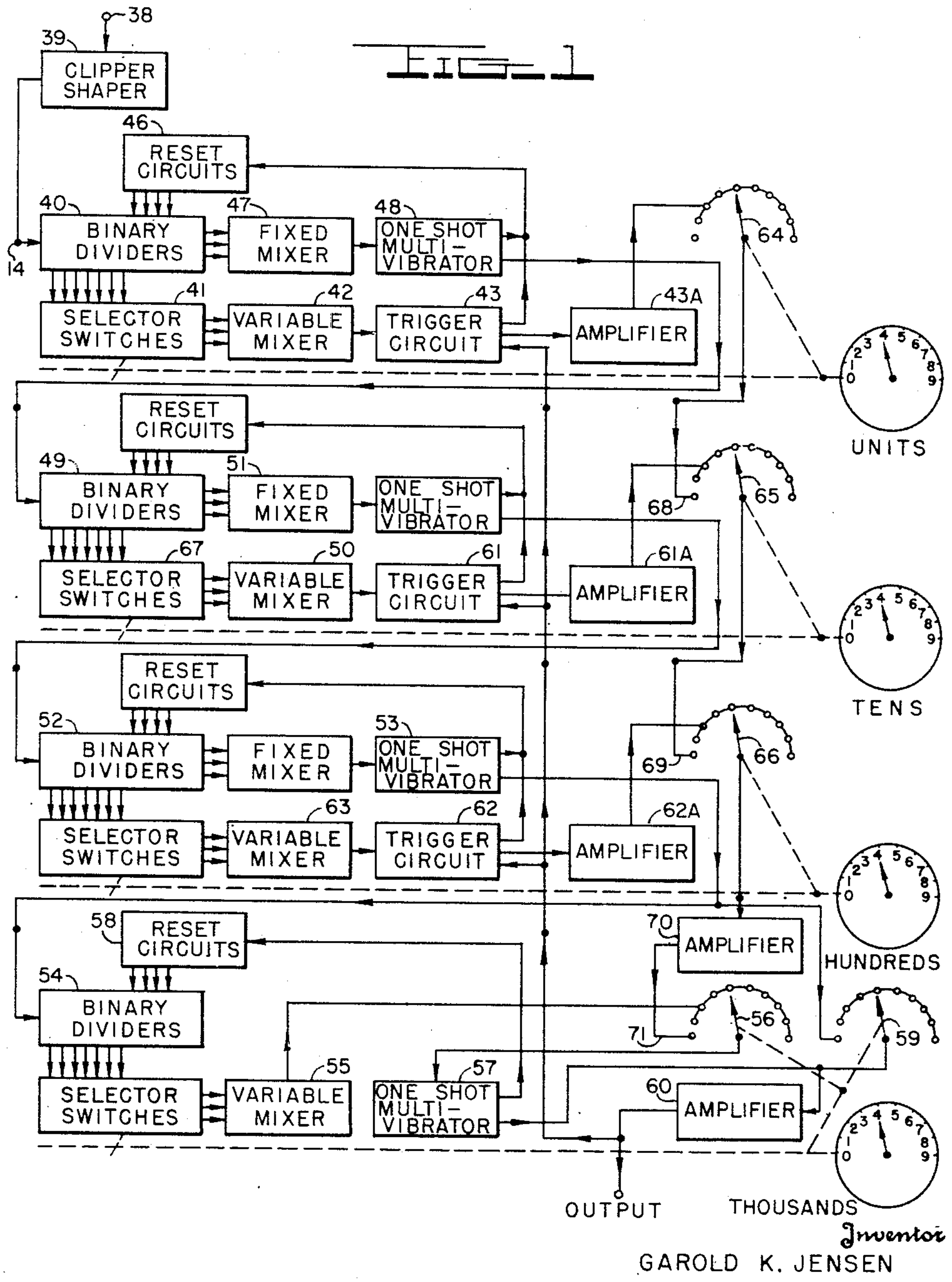
Fig. 1 shows partly in block form apparatus constructed in accordance with the teachings of the present invention.

With reference now to Fig. 1 of the drawing, a frequency divider circuit is shown therein principally in block form. Terminal 38 in the upper left hand corner receives the input signals. These signals may be of a pulse nature or a sinusoidal nature as typical illustrations. For the latter type of input signals it is desirable to obtain short duration pulse type signals to which end the clipper-shaper 39 is employed. The output from this clipper-shaper 39 is applied to the terminal 14 of a group of binary dividers 40 which are typically constructed in accordance with the circuit shown in Fig. 2, having several stages of scale-of-two counter circuits which will exist in various combinations of conductivity conditions for various input signals. Selector switches in block 41, of Fig. 1, are connected to the divider 40 to provide output signals for selected combinations of binary divider conditions. For example, if the units digit of the division ratio corresponds to the numeral 8 then the selector switches 41 are set, as hereinafter described, to produce an output signal at the end of a count of 8. When this selected combination of binary divider conditions is attained, the variable mixer 42 supplies a keying signal to the trigger circuit 43 to produce an output pulse signal. Trigger circuit 43 is preferably of the Eccles-Jordan type possessing two conditions of stability and having two separate input signal paths. In an initial condition of stability, trigger circuit 43 is responsive to signals from variable mixer 42 which signals can initiate the second condition of stability theren. In this condition subsequent signals from variable mixer 42 are ineffective until the first condition of stability is again obtained responsive to a reset signal obtained from the output amplifier 60 as later explained.

Upon triggering of the circuit 43 by a signal from the variable mixer 42, a pulse type signal is supplied to the reset circuits 46 to reset the binary dividers 40 to the reference condition.

In addition to the previously described connections to the binary divider circuit 40 through selector switches 41, additional fixed position output connections are made to anodes of the binary dividers in a combination indicative of the count of ten. These fixed connections supply signals to fixed mixer 47 which may be similar to the variable mixer 42. In this manner after the trigger circuit 43 is operated by variable mixer 42 resetting binary dividers 40 to the reference condition, variable mixer 42 is in operative and binary dividers 40 will continue to register input signals until the count of ten is registered. Upon each registry of this count of ten, fixed mixer 47 becomes operative to trigger the one-shot multivibrator 48 which as its name implies, possesses one single stable state together with an unstable state which may persist for a short period of time. The output signal from this one-shot multivibrator 48 is also supplied to the reset circuits 46 to provide reset of the binary dividers 40 to an initial or reference combination of conductivity states. In this manner after the initial count corresponding to the units value of the division ratio is registered by the binary dividers 40, trigger circuit 43 is inoperative and one signal is obtained at the one-shot multivibrator 48 for each ten succeeding input signals.

The output from one-shot multivibrator 48 is supplied to the binary dividers 49 of a succeeding decade circuit for the tens digit of division. These circuits are identical to those previously described for the units digit section, however the signals as obtained from the one-shot multivibrator 48 are of a pulse nature so that a clipper-shaper such as 39 is not normally required. The value of the tens decimal digit is registered by the binary dividers 49 to produce conduction by the variable mixer 50 with subsequent reset of binary dividers 49 through trigger circuit 61. After this reset the tens dividers also count in multiples of ten through operation of the fixed mixer 51 with reset circuits as before and provides signals to the hundreds digit section.

The apparatus for the hundreds digit may be identical in design and operation to that of the tens digit, first counting off the selected value of the hundreds digit then counting in multiples of ten providing output pulses from the one-shot multivibrator 53 which are supplied to the thousands binary divider 54.

Where the division ratio does not normally exceed 10,000 or even an extreme of approximately 25,000 only four digit circuits are required—for such an apparatus the thousands digit circuit would be the last. The last or thousands digit circuits are somewhat different from those for the previous digits since there is no longer the necessity for counting in multiples of ten after the value of the thousands digit is registered. For this reason the fixed mixer such as 47 and the one-shot multivibrator such as 48 of the units digit section are not present in the circuit for the thousands digit. Instead, output signals from the variable mixer 55 which again may be similar in construction to the variable mixer 42, are supplied through a multiple position switch 56 to a one-shot multivibrator 57.

Output pulse signals from the one-shot multivibrator 57 are supplied first to reset circuits 58 to provide reset of the thousands binary dividers 54 to reference conditions. Additionally output signals from one-shot multivibrator 57 are supplied to amplifier 60 from which they are obtained as output frequency divided pulse type signals. Each signal from amplifier 60 is also delivered to each of the bi-stable triggering circuits 43, 61 and 62 to return them to the condition wherein they are responsive to signals from the corresponding variable mixers 42, 50 and 63. At this point and by the action of trigger circuits 43, 61 and 62 all binary dividers and trigger circuits are again in the initial reference condition from which another complete cycle of operation as thus described may commence.

The type of operation thus described will take place whenever there is a value other than zero set in each of the division ratio selectors. To provide operation for the division ratios wherein zero might appear in one of the digit positions, additional circuitry is involved. In the first place the multiple position switches 64, 65, 66 and 56 compensate for the presence of a zero in any of the tens, hundreds and thousands digit selectors. The switches 64, 65, 66 and 56 are ganged with corresponding decimal digit selector switches that is, switch 64 is ganged for operation through ten positions with the selector switches 41, switch 65 is ganged for operation with the selector switches 67 and so on. When switch 64 is in any position other than zero position it supplies a signal from trigger circuit 43 and associated amplifier 43A to terminal 68 at the #1 position of switch 65 each time the value of the units digit is registered by binary dividers 40 at the start of a division cycle. If switch 65 is in the zero position when such signal is received, that signal is delivered to terminal 69 of switch 66. Again if switch 66 is in the zero position the same signal is delivered to amplifier 70. If also switch 56 is in the zero position, signals from amplifier 70 appearing at terminal 71 will be delivered to the one-shot multivibrator 57 to cause operation thereof to provide an output signal from amplifier 60. This operation is experienced whenever the division ratio is nine to one or less. Where a zero in the division ratio is for a lower order digit such as the units digit, the selector switches 41, as later described, will prevent operation of the variable mixer 42. However the fixed mixer 47 will still operate providing an output signal for each ten input signals. It is these signals that are delivered for counting by the succeeding decade stage as originally described.

Figure 2:
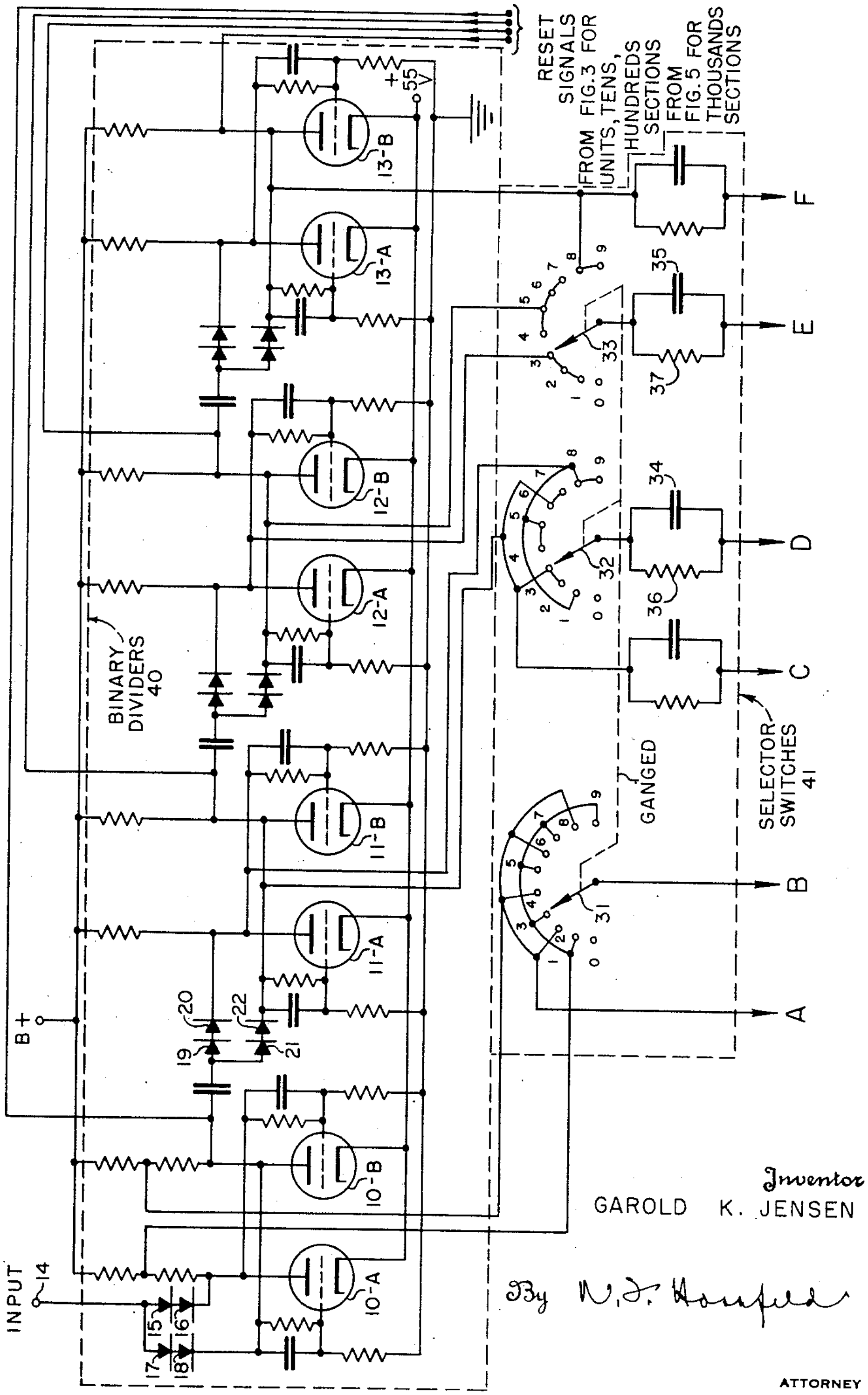
Fig. 2 is a schematic diagram of a multi-stage scale-of-two counter circuit as employed in the apparatus of the present invention showing input, output, and reset connections thereto.

Details of the components shown in block form in Fig. 1 are shown in additional figures and will now be discussed. With reference first to Fig. 2, details are shown therein of a typical multi-stage scale-of-two counter as employed in the binary dividers 40 etc. for each digit of the frequency division ratio. The fundamental features of this multi-stage scale-of-two counter circuit are probably familiar, each stage being of the Eccles-Jordan type having two tubes receiving an input signal at a first frequency and providing an output signal at half that frequency. To provide a possible ten positions, or combinations of counter stages, four scale-of-two counter circuits connected in cascade are employed. It should be borne in mind that on all of Figs. 2, 3, 4 and 5, dotted-in portions are shown to indicate generally the portions of each schematic drawing corresponding to the blocks of Fig. 1.

The apparatus of Fig. 2 is shown as having triode type electron tubes 10—A, 10—B, 11—A, 11—B, 12—A, 12—B, 13—A and 13—B. These tubes are cross-connected in pairs in which only one tube of each pair can be conductive at any instant. Typically pulse type input signals are applied at input terminal 14. These signals are delivered through uni-lateral impedance coupling elements such as the crystal diodes 15, 16, 17 and 18 to the grids of tubes 10—A and 10—B in parallel. As polarized, the uni-lateral impedance elements are set to deliver only negative pulses to the tube grids to produce current cut off of the conductive tube of the pair thereby initiating trigger action. Thus the circuit of tubes 10—A and 10—B will operate from one conductivity condition to another undergoing a complete cycle of operation in response to two successive input pulses at terminal 14.

The anode of tube 10—B is connected through uni-lateral impedance elements 19, 20, 21 and 22 which may also be of the crystal diode type to the grids of tubes 11—A and 11—B in parallel which are connected in a second trigger circuit similar to the first. Responsive to each initiation of current flow in tube 10—B, the negative voltage surge at the anode thereof produces cut off of the conductive tube 11—A or 11—B. Since each second input pulse at terminal 14 will provide this condition of tube 10—B, two complete cycles of operation of the circuit of tubes 10—A and 10—B (4 input pulses) are required to produce a cycle of operation of the circuit of tubes 11—A and 11—B.

In a similar manner a third trigger circuit of tubes 12—A and 12—B is connected to the anode of tube 11—B and experiences a complete cycle of operation for each two cycles of operation of circuit 11—A and 11—B. Likewise a fourth circuit of tubes 13—A and 13—B is connected to the anode of tube 12—B for half frequency operation therefrom.

An initial reference state for the trigger circuits may be selected in which all of the right hand tubes are conductive (10—B, 11—B, 12—B, 13—B). In this "zero" condition all of the left hand anodes are near (B+) potential. After a first input pulse to terminal 14, tube 10—A will be conductive and the plate of tube 10—B near (B+) potential. These conditions as well as those brought about in this and other trigger circuits upon application of nine additional input pulses are tabulated below.

| Count | Condition of Plates (+ nonconductive, − conductive) | | | | | | | |
|---|---|---|---|---|---|---|---|---|
| | 10-A | 10-B | 11-A | 11-B | 12-A | 12-B | 13-A | 13-B |
| 0 | + | − | + | − | + | − | + | − |
| 1 | − | + | + | − | + | − | + | − |
| 2 | + | − | − | + | + | − | + | − |
| 3 | − | + | − | + | + | − | + | − |
| 4 | + | − | + | − | − | + | + | − |
| 5 | − | + | + | − | − | + | + | − |
| 6 | + | − | − | + | − | + | + | − |
| 7 | − | + | − | + | − | + | + | − |
| 8 | + | − | + | − | + | − | − | + |
| 9 | − | + | + | − | + | − | − | + |
| 10 | + | − | − | + | + | − | − | + |

The selector switches shown in block in Fig. 1, corresponding to block 41 etc. are represented in Fig. 2 as switches 31, 32 and 33.

For determining the state of the stages of the counter to produce output signals when selected states are reached, a form of coincidence or gate circuit is used such as the variable mixers 42 etc. A typical circuit of this nature is shown in part of Fig. 3 and includes primarily the two electron tubes 23 and 24. Tube 24 is a triple grid tube and receives at the three grids 25, 26 and 27 signals from the trigger circuit selector switches 31, 32, 33 of Fig. 2. All grids 25, 26 and 27 are normally quite heavily biased with respect to the cathode because of the plus-55 volts at the cathode. However when these grids are simultaneously brought to high potential as a result of their connection through switches 31, 32 and 33 to non-conductive anodes of the trigger circuits of Fig. 2, the anode current path of tube 24 can be rendered conductive. To raise the potential of screen grid 26, considerable current must be supplied thereto. This current is provided by the operation of the amplifier tube 23 whose anode is coupled to grid 26 through capacitance 28. Resistance 29 provides a return current path for capacitance 28 and uni-lateral impedance element 30 "clamps" the grid 26 to suppress negative excursions thereof.

Figure 3:
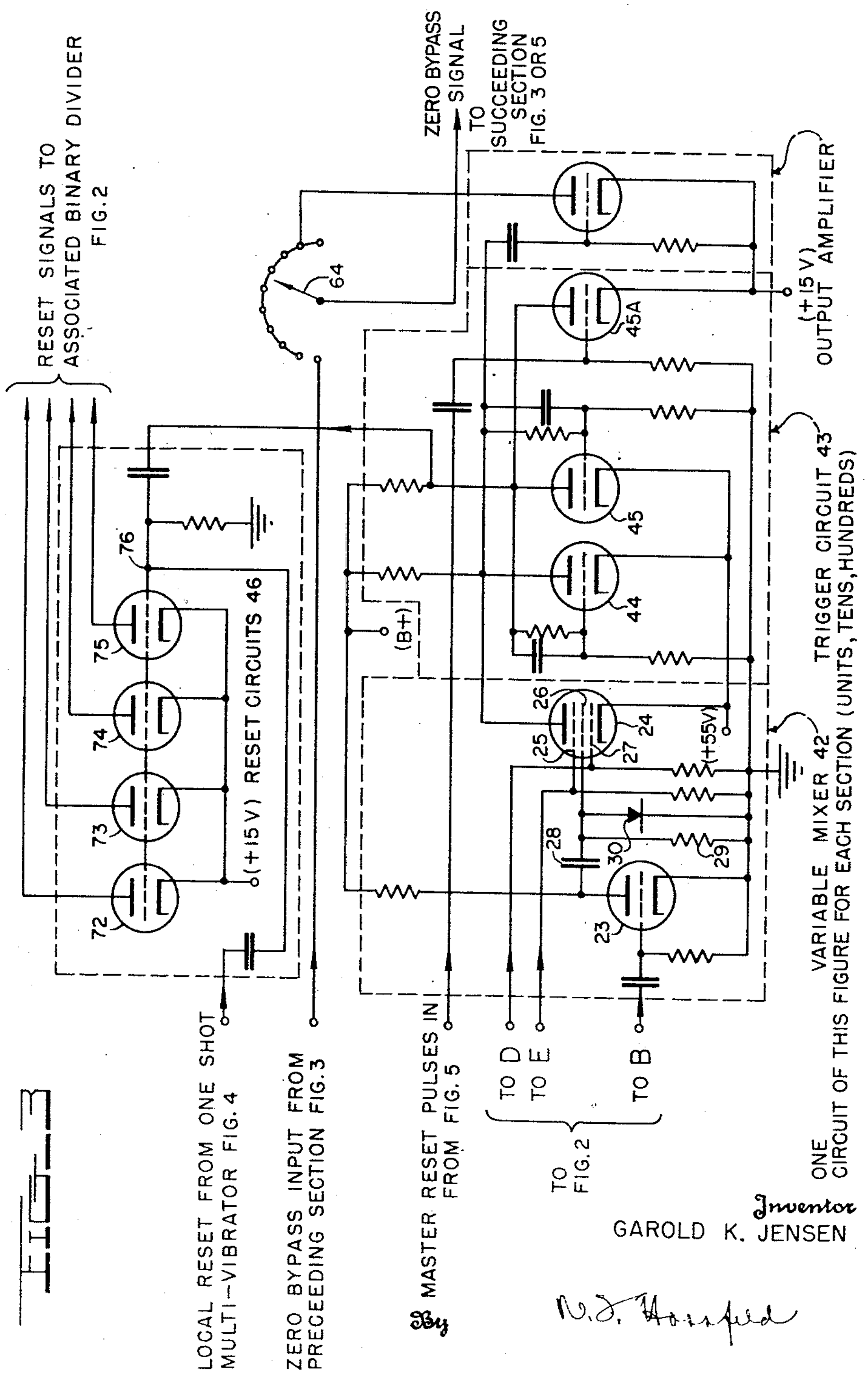
Figs. 3, 4 and 5 are schematic diagrams showing additional components of the block diagram of Fig. 1.

Application of signals from the typical counter tubes of Fig. 2 to the grids or gating circuits as shown in Fig. 3 is accomplished through the three section multiple position switches indicated in Fig. 2 by numerals 31, 32 and 33. These switches are ganged together and may be operated manually with rotation in synchronism for each decimal digit unit. The grid of tube 23 (Fig. 3) is connected to the movable contact of switch 31, (terminal B), grid 27 of tube 24 (Fig. 3) is connected to the movable contact of switch 32 (terminal D) while grid 25 of tube 24 (Fig. 3) is connected to the movable contact of switch 33 (terminal E). In accordance with the tabulation previously given for the various "counts," corresponding stationary contacts for the switches 31, 32, 33 are connected to appropriate anodes of the counter tubes, connections being made to tubes having positive (+) designation. Connections of the stationary contacts for the zero position of switches 31, 32, 33 is not required.

The stationary contacts of switch 31 are connected in the anode circuits of tubes 10—A and 10—B, the stationary contacts of switch 32 in the anode circuits of tubes 11—A and 11—B, and the stationary contacts of switch 33 in the anode circuits of tubes 12—A, 12—B and 13—B.

As an illustration of this method of connection, upon inspection of the previous tabulation it is seen that for a typical count of 1 with switches 31, 32, 33 (Fig. 2) in the 1 position, the anodes of tubes 10—B, 11—A, 12—A, and 13—A are at the high potential whereas the opposing anodes are at the low potential. Connection of the high potential anodes having the positive indication enclosed in parenthesis to the stationary contacts of the switches 31, 32, 33 controlling the three gating input circuits may thus be made. With this circuit arrangement each time the typical count of 1 is reached tube 24 will be rendered conductive.

At this point it is well to note that the signal inversion introduced by tube 23 must be taken into consideration. Hence the connection of the grid of tube 23 is made to the opposite anode from that given by the plus sign in the tabulation (tube 10—A). Further, if desired, the voltage amplification produced by tube 23 may in part be counter-balanced by the connection to only a part of the total anode circuit load resistance as shown in Fig. 2. For the other trigger circuits, connection is made direct to the anode terminals.

Coupling condensers 34 and 35 Fig. 2, bypassed by resistances 36 and 37 are employed in the signal path from switches 32 and 33 to grids 27 and 25. This connection assists in the maintenance of low D.-C. potential at the grids 25 and 27 yet supplies the full signal amplitude to the grids upon occurrence of the trigger operation in a trigger circuit such as 11—A, 11—B.

The previously mentioned trigger circuit 43 is shown in Fig. 3 having the tubes 44 and 45 together with a keying tube 45—A. This circuit receives "set" signals from the anode of variable mixer tube 24 which bring tube 44 to conduction each time it is non-conductive upon initiation of conduction by tube 24. Tube 45—A receives master reset pulses from amplifier 60 of Fig. 5 each time a quantity of input signals equal to the value of the division ratio is counted by the overall system. By these signals, tube 45—A is brought to momentary conduction to bring the trigger circuit tube 45 to conduction.

Additional components of the overall apparatus which have not been previously described will now be described in considerable detail. A first component to be described appears in Fig. 3 and is identified therein as the reset circuits of block 46. As shown these reset circuits include four biased electron tubes 72, 73, 74 and 75 which are normally non-conductive. Positive polarity input signals are applied to these tubes in parallel from the anode of tube 45 and from the one-shot multivibrator anode 82 of Fig. 4. The anodes of tubes 72, 73, 74 and 75 are connected individually to the right hand anodes of the tubes of the corresponding trigger circuits as typified in Fig. 2 and indicated thereon. With these connections each time a positive pulse is applied to reset grid terminal 76, conduction by the reset tubes through the corresponding anode load resistance of the trigger circuits of Fig. 2 will cause the trigger circuits to achieve a zero condition in which the right hand tube of each circuit is conductive.

Figure 4:
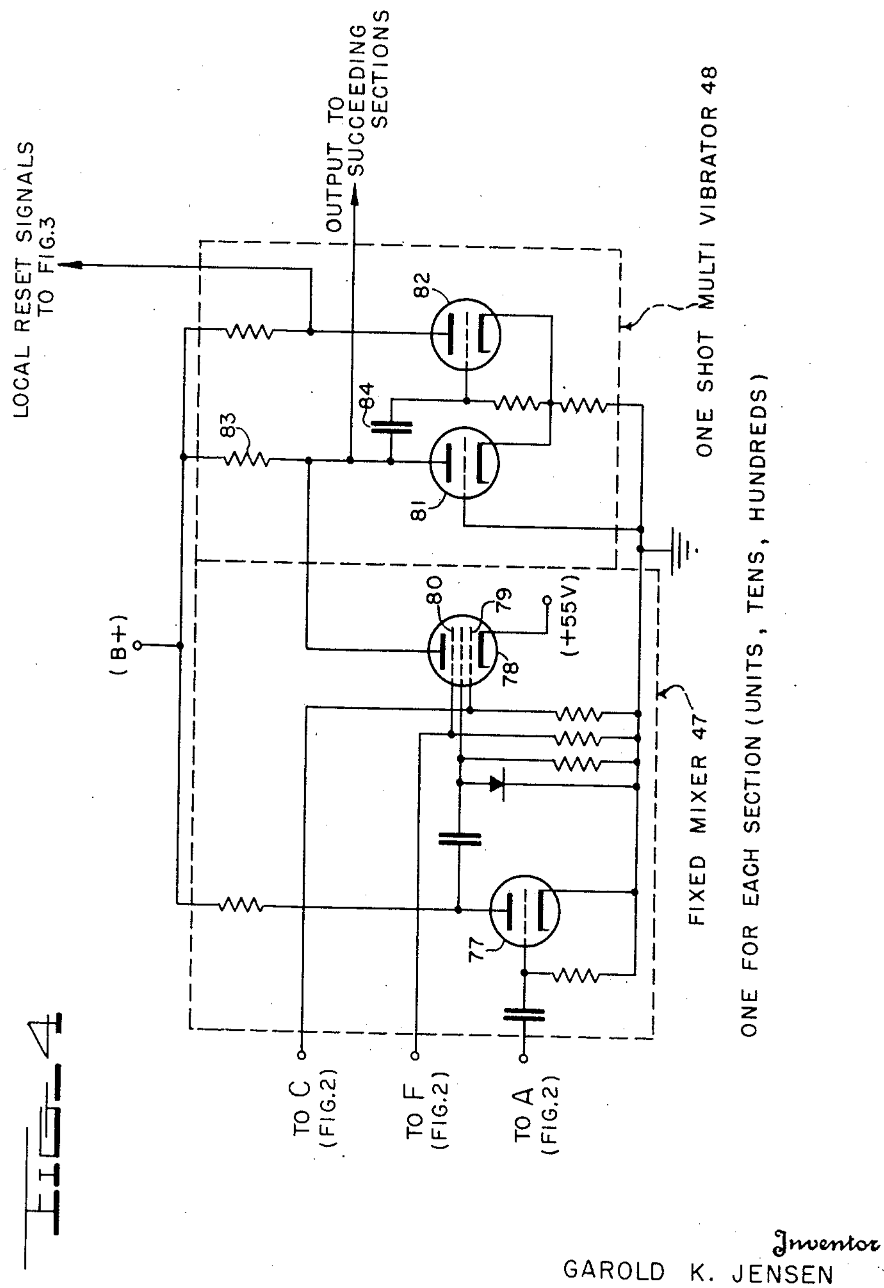

Details of the fixed mixers such as 47 and the one-shot multivibrator such as 48 for the units, tens and hundreds digits are shown in Fig. 4. The fixed mixer 47 includes the electron tubes 77 and 78 in circuit construction practically identical to that of the previously discussed tubes 23 and 24 in the variable mixer 42 (Fig. 3) differing therefrom only in the source of input signals. As indicated by the lettered terminals referring to Fig. 2, the grid of tube 77 receives signals from the anode of tube 10—B, grid 79 receives signals from the anode of tube 11—B and grid 80 receives signals from the anode of tube 13—B. An inspection of the previous tabulation will show that this connection corresponds to the conditions for the count of 10 wherein these anodes possess positive notation and is the first time in the sequential tabulation that such a condition appears. From this circuit arrangement therefore it is seen that tube 78 will achieve conduction each time the binary divider cooperative therewith achieves the ten count combination.

The one-shot multivibrator 48 is shown in Fig. 4 as those components associated with the electron tubes 81 and 82. By virtue of the capacitance 84 coupling the anode of tube 81 and the grid of tube 82 the normal condition for the one-shot multivibrator is that wherein tube 82 is conductive. This condition is altered however upon the initiation of conduction in tube 78 with the resulting drop in potential across resistance 83. Tube 81 is thus brought to conduction for a period of time determined primarily by the time constants of the circuits associated with capacitance 84. In this manner then, a short duration positive pulse is produced at the anode of tube 82 while a short duration negative pulse is produced at the anode of tube 81. The positive pulse from the anode of tube 82 is delivered to the reset circuits 46 (Fig. 3) in a path parallel with the reset signal from trigger circuit 43. The negative signal from the anode of tube 81 goes to the succeeding binary divider 49 (Fig. 1) in the tens digit circuit as input pulses thereto.

The thousands or last decade circuit as previously mentioned is different from the circuit for the other digits in that the fixed mixer such as 47 or 51 is not employed. Additional differences will be noted in Fig. 5 which shows circuit details of the variable mixer 55, the one-shot multivibrator 57, amplifiers 60 and 70, switches 56 and 59 and reset circuits 58. The binary divider circuit 54 for the thousands section is as shown in Fig. 2 except it does not contain the fixed output paths indicated by A, C and F. Only the variable signal paths B, D and E are employed delivering signals as indicated on Fig. 5 to grids 85, 86 and 87 respectively of electron tubes 88 and 89. The circuit of these tubes 88 and 89 is again similar to the first discussed circuit of tubes 23 and 24 in Fig. 3. A difference lies however in that the output of tube 89 is connected through switch 56 to the one-shot multivibrator of tubes 90 and 91. This one-shot multivibrator may be similar in structure to the previously described multivibrator 48 of Fig. 4. The negative pulse output as obtained at the anode of tube 90 responsive to conduction by tube 89 is supplied direct to the amplifier tube 92 which is the primary component of amplifier 60 in Fig. 1. To provide output signals from the system when the thousands decade selector is in zero position the direct signal path from the hundreds decade output circuit through the zero position of switch 59 to amplifier tube 92 is included.

Figure 5:
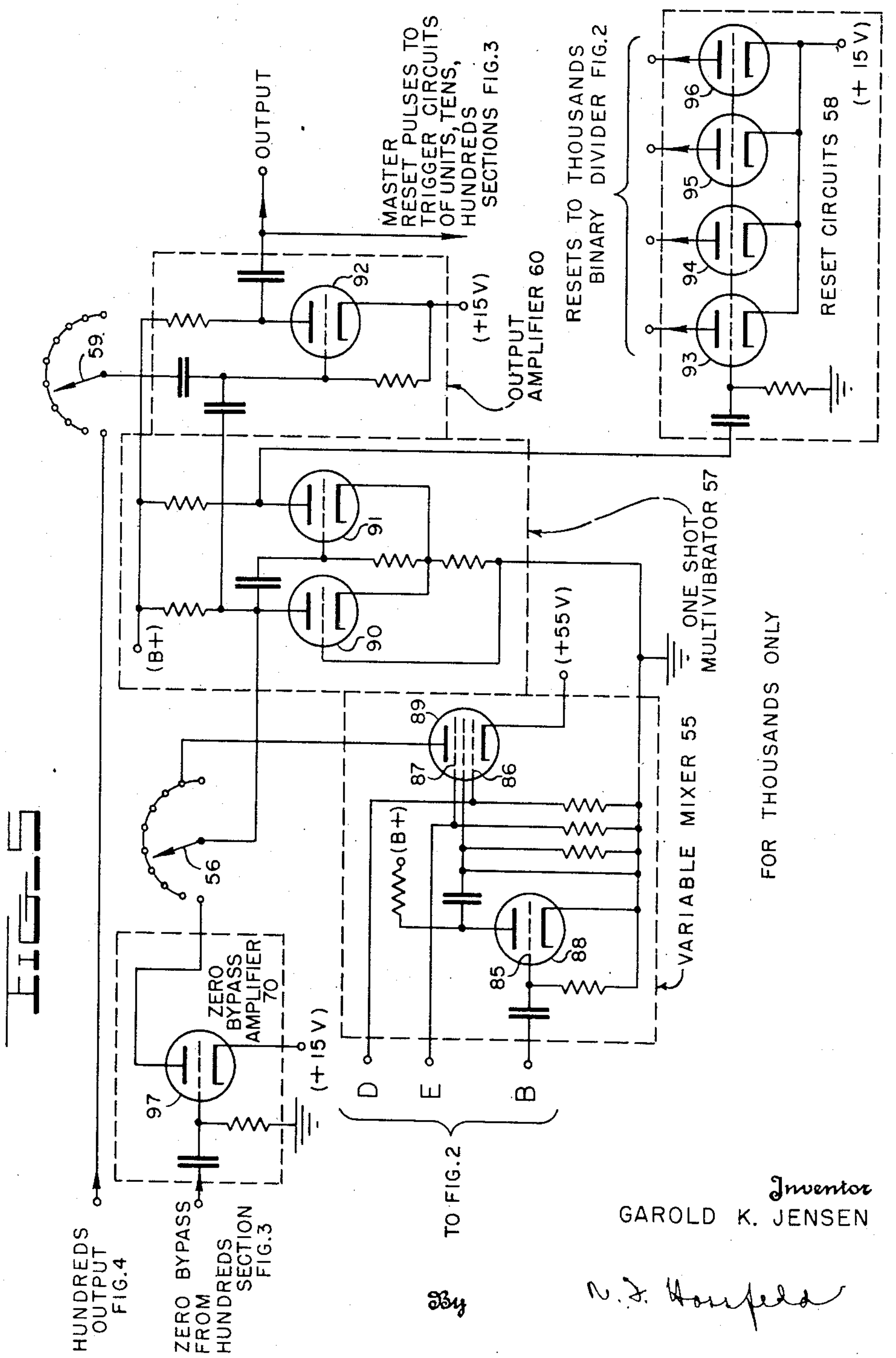

Reset signals for the thousands binary dividers 54 (Fig. 1) are obtained from the reset tubes 93, 94, 95 and 96 of Fig. 5 and are delivered in the same manner as previously described to the right hand anodes of the binary divider circuits. These reset signals are derived from the short duration positive pulse signals from the anode of tube 91. When the thousands decade selector is in the zero position, the one-shot multivibrator 57 of tubes 90 and 91 is connected through the zero position of switch 56 and the amplifier tube 97 for operation to produce output signals responsive to zero bypassed signals from the hundreds section (switch 66 in Fig. 1).

With the overall circuit and its components thus described, the true import of the present invention may be readily visualized.

Although certain specific embodiments of this invention have been disclosed and described it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A frequency divider operative to produce division of an applied signal by selectable whole number ratios comprising, a plurality of divider sections connected in cascade, one for each decimal digit of the division ratio, counter means within each section counting first a number of signals equal to the value of the corresponding decimal digit then providing a signal to a succeeding section for each tenth input pulse thereto, an output signal path providing an output signal each time the value of the highest order decimal digit of the division ratio is reached, and means resetting all divider sections to reference conditions for succedent counting upon the production of each output signal.

2. A frequency divider operative to produce division of an applied signal by selectable whole number ratios comprising, a plurality of divider sections connected in cascade, one for each decimal digit of the selected division ratio, counter means within each section registering in combinations of conductivity conditions therein, the quantity of input signals, primary reset signal means for each counter resetting the counter to a reference condition following each registry of a number of signals equal to the value of the corresponding decimal digit, secondary reset signal means for each counter resetting the counter to the reference condition following each subsequent registry of ten signals, an output signal path providing an output signal of frequency reduced from the input upon registry of the desired count in the highest order digit of the selected division ratio, and means responsive to the production of each output signal to reset all sections to a reference condition.

3. A frequency divider responsive to produce division of applied signals comprising, a counter capable of registering at least ten counts for an equal number of applied signals, primary selector means responsive to counter registry to produce primary output signals the first time a selected count less than ten is registered, means blocking the primary selector means following the production of a primary signal, secondary selector means responsive to counter registry to produce secondary output signals for each tenth succeeding input signal, and means unblocking the primary selector means after the production of a selected quantity of secondary output signals.

4. A frequency divider responsive to produce division of applied electrical signals comprising, a binary electrical counter capable of registering at least ten characteristic combinations of binary conditions responsive to ten applied signals, a primary selector adjustable to provide a primary output signal upon the attainment of a binary combination characteristic of applied signals in quantity between one and nine, means blocking the primary selector means after the production of each primary output signal, a secondary selector fixed to provide secondary output signals upon the attainment of the binary combination characteristic of ten applied signals, means resetting the counter to the reference condition following each primary and secondary output signal, and means unblocking the primary selector after the production of a selected quantity of secondary output signals.

5. In combination, a first frequency divider section comprising four scale-of-two counter stages connected in cascade possessing sixteen possible states of conduction including a zero state, a reset circuit connected to said stages to return the same to the zero state upon the receipt of an impulse, a control circuit connected to said counter stages selectively responsive to any state between one and nine to produce an impulse, a signal path feeding the initial impulse from said control circuit to said reset circuit and thereafter insensitive to subsequent impulses, a second control circuit connected between said counter stages and reset circuit to furnish said reset circuit with an impulse responsive to the attainment of the tenth state of said counter stages, a second similar divider circuit connected to receive as input signals the impulses from said second control circuit, additional divider sections similarly connected in cascade with one another, and means responsive to the output from the final section for actuating all reset circuits and simultaneously enabling said signal paths.

6. In combination, a first frequency divider section comprising four scale-of-two counter stages connected in cascade possessing sixteen possible states of conduction including a zero state, a reset circuit connected to said stages to return the same to the zero state upon the receipt of an impulse, a control circuit connected to said counter stages selectively responsive to any state between one and nine to produce an impulse, a signal path feeding the initial impulse from said control circuit to said reset circuit and thereafter insensitive to subsequent impulses, a second control circuit connected between said counter stages and reset circuit to furnish said reset circuit with an impulse responsive to the attainment of the tenth state of said counter stages, and means fed from the output of the second control circuit for enabling said signal path in response to the production of a selected number of output signals from said second control circuit and thereby simultaneously actuating said reset circuit.

GAROLD K. JENSEN.

REFERENCES CITED

The following references are of record in the file of this patent:

UNITED STATES PATENTS

| Number | Name | Date |
|---|---|---|
| 2,087,039 | McMaster | July 13, 1937 |
| 2,295,968 | Poole | Sept. 15, 1942 |
| 2,401,729 | Goldsmith | June 11, 1946 |
| 2,422,698 | Miller | June 24, 1947 |
| 2,490,500 | Young | Dec. 6, 1949 |

OTHER REFERENCES

Predetermined Counter, J. J. Wild, Electronics, March 1947, pages 120–123.

Predetermined Counters, R. J. Blume, Electronics, February 1948, pages 88–93.